(12) United States Patent
Hack et al.

(10) Patent No.: US 12,497,065 B2
(45) Date of Patent: Dec. 16, 2025

(54) METHOD AND DEVICE FOR OPERATING A MOTORCYCLE

(71) Applicant: Robert Bosch GmbH, Stuttgart (DE)

(72) Inventors: Almut Hack, Stuttgart (DE); Udo Schulz, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 261 days.

(21) Appl. No.: 17/791,206

(22) PCT Filed: Jan. 18, 2021

(86) PCT No.: PCT/EP2021/050929
§ 371 (c)(1),
(2) Date: Jul. 7, 2022

(87) PCT Pub. No.: WO2021/180385
PCT Pub. Date: Sep. 16, 2021

(65) Prior Publication Data
US 2023/0339494 A1   Oct. 26, 2023

(30) Foreign Application Priority Data
Mar. 10, 2020  (DE) .................... 10 2020 202 986.5

(51) Int. Cl.
*B60W 50/16* (2020.01)
*B62J 3/10* (2020.01)
(Continued)

(52) U.S. Cl.
CPC ............... *B60W 50/16* (2013.01); *B62J 3/10* (2020.02); *B62J 6/26* (2020.02); *B62J 45/20* (2020.02); *B62J 50/21* (2020.02); *B60W 2300/36* (2013.01)

(58) Field of Classification Search
CPC ............ B60W 50/16; B60W 2300/36; B60W 50/0097; B60W 2050/0029; B60W 50/14;
(Continued)

(56) References Cited

U.S. PATENT DOCUMENTS 8,903,608 B2 * 12/2014 Niemz ............. B60W 60/0059
701/25
9,081,387 B2 * 7/2015 Bretzigheimer ... B62D 15/0265
(Continued)

FOREIGN PATENT DOCUMENTS

CA        3079092 A1    5/2019
DE   102009020649 A1 * 11/2010 .......... B60T 8/17558
(Continued)

OTHER PUBLICATIONS

DE102011106082A1 machine translation (Year: 2013).*
(Continued)

*Primary Examiner* — Fadey S. Jabr
*Assistant Examiner* — Mark Robert Heim
(74) *Attorney, Agent, or Firm* — NORTON ROSE FULBRIGHT US LLP

(57) ABSTRACT

A method for operating a motorcycle. In the method, an environment of the motorcycle is acquired and free spaces in the environment that are usable by the motorcycle are detected, and a change in the free spaces and a trajectory of the motorcycle are predicted and evaluated for conflicts, and in a conflict case, a conflict-free alternative trajectory is ascertained for the motorcycle and communicated to a rider of the motorcycle.

13 Claims, 4 Drawing Sheets

(51) Int. Cl.
*B62J 6/26* (2020.01)
*B62J 45/20* (2020.01)
*B62J 50/21* (2020.01)

(58) Field of Classification Search
CPC ....... B62J 3/10; B62J 6/26; B62J 45/20; B62J 50/21; B62J 27/00; G08G 1/166; B60K 2360/179; B60K 35/28
See application file for complete search history.

(56) References Cited

U.S. PATENT DOCUMENTS

| | | | |
|---|---|---|---|
| 9,605,971 B2* | 3/2017 | Niehsen | B60K 35/00 |
| 10,029,683 B1* | 7/2018 | Ginther | B60T 7/12 |
| 10,150,407 B2* | 12/2018 | Takahashi | B60Q 1/503 |
| 10,222,802 B2* | 3/2019 | Kuttenberger | B62J 27/00 |
| 11,043,127 B2* | 6/2021 | Sakaguchi | B60W 30/10 |
| 11,518,330 B2* | 12/2022 | Park | G06F 18/251 |
| 11,535,333 B2* | 12/2022 | Benkert | B62K 11/14 |
| 11,679,762 B2* | 6/2023 | Lee | B60W 30/0953 701/26 |
| 2004/0181338 A1* | 9/2004 | Dobler | G08G 1/165 701/1 |
| 2008/0211644 A1* | 9/2008 | Buckley | G08G 1/165 340/932.2 |
| 2012/0173068 A1* | 7/2012 | Seiter | B60W 30/16 701/70 |
| 2013/0311075 A1* | 11/2013 | Tran | B60Q 1/535 701/117 |
| 2014/0071240 A1* | 3/2014 | Chen | G06T 7/70 348/46 |
| 2015/0353084 A1* | 12/2015 | Schroeder | B60W 30/0956 701/301 |
| 2017/0162055 A1* | 6/2017 | Lehner | B60W 50/14 |
| 2017/0174261 A1* | 6/2017 | Micks | B62D 15/029 |
| 2017/0192433 A1* | 7/2017 | Kuttenberger | B62J 45/4151 |
| 2018/0118106 A1* | 5/2018 | You | G08G 1/005 |
| 2018/0170388 A1* | 6/2018 | Shin | B60W 60/001 |
| 2018/0257647 A1* | 9/2018 | Jurca | G01S 13/931 |
| 2018/0301036 A1* | 10/2018 | Villavicencio | B60W 40/10 |
| 2018/0319327 A1* | 11/2018 | Cunningham, III | B62D 15/027 |
| 2019/0098953 A1* | 4/2019 | Strickland | G06V 20/58 |
| 2020/0023836 A1* | 1/2020 | Schneider | B60W 30/095 |
| 2020/0180611 A1* | 6/2020 | Klingemann | B60W 50/14 |
| 2020/0333792 A1* | 10/2020 | Buss | B60W 60/001 |
| 2021/0082297 A1* | 3/2021 | Jacobus | B60W 30/09 |
| 2021/0086780 A1* | 3/2021 | Zhang | G05D 1/0088 |
| 2021/0179225 A1* | 6/2021 | Hara | B62D 37/00 |
| 2021/0221368 A1* | 7/2021 | Lavi | G06V 20/56 |
| 2022/0073068 A1* | 3/2022 | Lavi | B60R 11/04 |
| 2022/0105963 A1* | 4/2022 | Costa | B60W 60/0015 |
| 2022/0135165 A1* | 5/2022 | Tamashima | B60W 10/18 701/96 |
| 2022/0161788 A1* | 5/2022 | Tamashima | B60W 30/12 |
| 2023/0139711 A1* | 5/2023 | Keßler | B62D 5/0463 701/41 |
| 2023/0174096 A1* | 6/2023 | Kuntschar | G05D 1/0212 701/23 |
| 2023/0222918 A1* | 7/2023 | Kohara | G08G 1/167 340/988 |
| 2023/0278573 A1* | 9/2023 | Berniolles | B60W 30/09 701/70 |
| 2023/0347926 A1* | 11/2023 | Hayakawa | G08G 1/052 |

FOREIGN PATENT DOCUMENTS

| | | | | |
|---|---|---|---|---|
| DE | 102011106082 A1 * | 1/2013 | | B60Q 1/346 |
| DE | 102013218458 A1 * | 3/2015 | | G08G 1/16 |
| JP | 2020500784 A | 1/2020 | | |
| WO | 2019180875 A1 | 9/2019 | | |
| WO | 2019239402 A1 | 12/2019 | | |

OTHER PUBLICATIONS

DE102009020649A1 machine translation (Year: 2010).*
DE-102013218458-A1 machine translation (Year: 2015).*
International Search Report for PCT/EP2021/050929, Issued Apr. 1, 2021.

* cited by examiner

METHOD AND DEVICE FOR OPERATING A MOTORCYCLE

FIELD

The present invention relates to a method and a device for operating a motorcycle.

BACKGROUND INFORMATION

Different driver assistance systems for reducing the stress of a driver may be provided in a passenger car. To this end, the passenger car may have different sensors for acquiring a vehicle environment. The driver assistance systems can access data from the sensors and detect and analyze a current driving situation. Based on the analysis, driving instructions are able to be generated for the driver. The driving instructions in a passenger car can be provided to the driver via different display systems.

In a motorcycle, the sensors and also the display systems are generally lacking. A rider of the motorcycle detects the environment of the motorcycle with his or her eyes and responds to these impressions. The motorcycle is controlled by its rider in a purely manual fashion.

SUMMARY

The present invention provides a method for operating a motorcycle, a device for operating a motorcycle, and a corresponding computer program product and a machine-readable memory medium. Advantageous further refinements and improvements of the present invention result from the disclosure herein.

Embodiments of the present invention may advantageously make it possible to assist in perceiving a rider of a motorcycle. More specifically, in typical motorcycle driving situations, e.g., when driving along lanes, dangerous situations are able to be detected and a warning be provided to the driver.

In accordance with an example embodiment of the present invention, a method for operating a motorcycle is provided, in which an environment of the motorcycle is acquired and imaged in environment information, and free spaces in the environment that are usable by the motorcycle are detected with the aid of the environment information and imaged in free space information, and a change in the free spaces is predicted with the aid of the free space information, and a trajectory of the motorcycle is predicted using sensor data of the motorcycle, and the change in the free spaces and the trajectory are evaluated for conflicts, and in a conflict case, a conflict-free alternative trajectory is ascertained for the motorcycle using the change and communicated to a rider of the motorcycle as trajectory information.

Ideas in connection with embodiments of the present invention may be seen as being based, among others, on the thoughts and recognitions described in the following text.

A motorcycle may be understood as a motorized two-wheeled vehicle. The motorcycle is a single-track vehicle and, like a bicycle, is able to be kept balanced by stabilizing movements of its rider, minimal steering movements and, starting at a certain velocity, by gyroscopic forces of its wheels. The balance is unstable or must be monitored continuously. Without the stabilizing movements, steering movements and/or gyroscopic forces, the motorcycle could tip over to the side and fall.

An environment of the motorcycle may particularly be understood as a region in front of the motorcycle. However, the environment may also include regions to the side of the motorcycle and/or behind the motorcycle. The environment is able to be acquired by at least one camera, for example. The camera may be fixedly installed on the motorcycle or else also be placed in the form of a helmet camera or body camera on the rider. Objects and free spaces are able to be detected in image information of the camera using machine vision, e.g., semantic segmentation methods.

Alternatively or additionally, the environment is also able to be acquired using ultrasonic sensors or at least one radar sensor. Objects are also detectable in ultrasonic data and radar data.

Open spaces of a road between restricting objects may be denoted as free spaces. An open space located on the side between two vehicles may be referred to as a lane. If a lane is wider than the motorcycle, then the motorcycle is able to be steered through this lane without a collision. A necessary distance from the vehicles may then depend on the driving skills of the rider and/or a current velocity, for example.

The open spaces may change because of movements of the objects and in particular by movements of the other vehicles, or in other words, the open spaces may become larger or smaller. The open spaces may become longer and/or wider when the restricting objects move away from one another. The free spaces may become shorter and/or narrower when the restricting objects come closer to one another. This change may be predicted in an anticipatory manner for a limited time horizon by extrapolating movements of the objects, for example.

In accordance with an example embodiment of the present invention, a trajectory of the motorcycle is able to be determined from sensor values of the motorcycle. For instance, a steering angle of the motorcycle, a velocity of the motorcycle and an angle of inclination of the motorcycle are able to be acquired in order to determine a current curve radius of the motorcycle. It is also possible to extrapolate the trajectory up to a limited time horizon. The time horizon may be a function of the velocity.

In a conflict case, a conflict exists between the trajectory and the limits of the open spaces. The conflict case is able to be identified when the trajectory will touch at least one object restricting the free space within the time horizon. A conflict is also determined if a free space along the trajectory will most likely become smaller than the motor vehicle by less than the safety distance.

In accordance with an example embodiment of the present invention, an alternative trajectory guides the motorcycle past a location of the conflict without infringing upon the limit of the free space or without dropping below the safety distance. At least one active intervention in a dynamics of the motorcycle is required in order to reach the alternative trajectory. For instance, an acceleration operation, a braking operation and/or at least one steering operation may be required to move the motorcycle to the alternative trajectory.

The alternative trajectory is able to be communicated to the rider of the motorcycle via a recommended direction, for instance. The recommended direction may point either to the right or left. As an alternative or in addition, the alternative trajectory may be communicated to the rider via a braking recommendation or an acceleration recommendation. The recommendations may be provided in an optic, haptic and/or acoustic manner, for example.

If the motorcycle is equipped with corresponding actuators, then it is possible to communicate the directional recommendation to the rider in the form of haptic information by a steering assistance in the correct direction. In the same way, the brake system of the motor cycle is able to be actuated for a brake pressure in order to communicate the braking recommendation for the alternative trajectory to the driver, for instance. In addition, an engine control of the motorcycle is able to be actuated for an abrupt acceleration change in an effort to communicate the acceleration recommendation for the alternative trajectory to the rider.

To predict the change in the free spaces and, alternatively or additionally, to predict the trajectory, a characteristic ego movement of the motorcycle may be taken into account. In the case of straight-ahead driving as a characteristic ego movement, in particular at a low speed, the rider drives along a serpentine line in order to stabilize the driving position.

Because of the weaving motion, a connecting line between the contact point of the rear wheel and a contact point of the front wheel is able to be offset to the right and the left from a center of gravity of the motorcycle in each case in an effort to maintain the balance. This serpentine line may become progressively more pronounced with decreasing speed of the motorcycle.

To initiate cornering, the rider generally first induces as a characteristic ego movement a counter pulse opposite the desired curve direction in order to slightly tilt the motorcycle into the curve or to shift the center of gravity in the direction of the inside of the curve. Next, the driver steers the motorcycle through the curve using an inclined position. At the end of the curve, an upright movement takes place by a stronger steering movement in the curve direction in order to return the center of gravity back over the connecting line. This characteristic ego movement has a space requirement that becomes greater than a projection of the motorcycle onto the ground or into the plane. This makes it possible to satisfy the greater space requirement of the motorcycle.

In accordance with an example embodiment of the present invention, a drivability of the alternative trajectory is able to be ascertained using a mathematical single-track model of the motorcycle. With the aid of the single-track model, a dynamic stability of the motorcycle can be ensured. If an alternative trajectory is classified as drivable, then the motorcycle is able to be safely steered onto the alternative trajectory without a radical change in direction and/or change in velocity. The single-track model can image a dynamic behavior of the motorcycle in an algorithm. With the aid of the single-track model, it can be checked, for example, whether a curve radius of the alternative trajectory is able to be driven at the current velocity. In the same way, a straightening moment is able to be considered when braking if braking is to take place in a curve of the alternative trajectory. Examining the drivability makes it possible even for a less experienced driver to safely guide the motorcycle on the alternative trajectory.

To predict the change in the free spaces, a movement prediction of other road users is able to be carried out. A movement prediction can predict possible and/or likely movements and/or trajectories of the road users with a certain probability. Current movements and/or trajectories of the other road users in the environment of the motorcycle are able to be detected in sensor data and evaluated. The movements and/or trajectories for the movement prediction may be extrapolated within the time horizon.

The movement prediction may be prepared using trajectory information of the other road users. At least one other road user is able to supply trajectory information about his or her trajectory covered so far, for instance via a digital communications channel. Information about a velocity of the road user, an acceleration of the road user, a driving direction of the road user or a steering angle of the road user, for example, may be included in the trajectory information. The trajectory information may also directly image a planned future trajectory of the road user. The trajectory information makes it possible to carry out the movement prediction with high accuracy. The trajectory information is independent of the field of view of the sensors of the motorcycle so that a larger field of view is obtained.

When detecting the environment, light signals of the other road users are able to be acquired. The movement prediction may be made utilizing the light signals. For example, light signals may be provided by flashing lights, brake lights and/or reversing lights of the other road users. A flashing light may indicate an upcoming lane change. An activated brake light may indicate a braking operation. Light signals are able to be seen before a movement is detectable. As a result, the changes in free spaces can be predicted in a more optimal or anticipatory manner.

In accordance with an example embodiment of the present invention, in a conflict case, warning signals can be transmitted to the other road users. The warning signals may be sent automatically and without any action by the driver. Warning signals are able to be output in an optical and/or acoustic manner. For example, a headlight of the motorcycle can be used as a headlight flasher. In the same way, flashing lights of the motorcycle are able to be activated as hazard warning lights. Alternatively or additionally, a signal horn of the motorcycle can be activated. The warning signals may feature a sequence of pulses that are recognizable as having been generated artificially. For example, the pulses may be sent in a rapid sequence. Alternatively or additionally, the pulses may be sent as a conspicuous pattern.

In accordance with an example embodiment of the present invention, the alternative trajectory can be communicated to the rider with the aid of haptic signals. Haptic signals are able to be transmitted to the motorcycle via contact points of the rider. For instance, the contact points may be the steering handlebars, the seat cushion, the footrests and/or contact areas for the knees. The contact points may be made to vibrate, for example. The vibration is able to be supplemented or replaced by pulses. The haptic signals can be supplied as characteristic signal patterns.

The rider can be informed of the alternative trajectory with the aid of acoustic signals. Acoustic signals may be supplied via sound generators on the motorcycle. In the same way, acoustic signals may be supplied via loudspeakers in the helmet. Acoustic signals can be warnings and/or instructions. For example, a dangerous situation may be pointed out to the rider by a warning. In the same way, a warning may also prompt the driver to act according to the alternative trajectory. Haptic signals may be acoustically accentuated in order to amplify their effect.

The alternative trajectory is able be communicated to the rider in an optical manner. In the process, the alternative trajectory can be superimposed onto the field of view of the rider. Optical signals, for example, may be provided via warning lights and/or signal lamps. The warning lights and/or signal lamps may be part of a cockpit of the motorcycle. For example, directional indicators of the cockpit can be used to indicate an evasion direction. The warning lamps and/or signal lamps may also be disposed in the cockpit in addition. Similarly, the warning lights and/or signal lights may be placed on the helmet.

The optical signals are also able to be graphically supplied via a display. The display can be part of the cockpit. The display may also be disposed on the helmet or be part of a separate device. For instance, the display may be used to display navigation information in a normal case.

The alternative trajectory is able to be ascertained using map information of the environment. The alternative trajectory can consider upcoming danger points. For example, a curve radius of a curve lying ahead is able to be taken into account and, for instance, a braking operation instead of a theoretically possible acceleration operation may be used as part of the evasion trajectory.

In accordance with an example embodiment of the present invention, it is possible to actuate the motorcycle to follow the alternative trajectory if the rider shows no response to the communication within a reaction period. An actuation of the motorcycle may actuate an acceleration operation or braking operation and/or a steering operation. The steering operation is able to be actuated by a steering actuator with the aid of which a steering angle of the front wheel is adjustable. The braking operation may be actuated at the brake system of the motorcycle. The acceleration operation is able to be actuated via the motor control of the motorcycle. During the reaction period, the alternative trajectory is able to be updated on a continuous basis to allow for a safe reaction to the changes in the free spaces. If the driver himself assumes the control, the actuation may be aborted. However, the communication is able to be maintained via all possible communications paths in order to continue to alert the driver to the alternative trajectory.

For example, the present method may be implemented in software or hardware or in a mixed form of software and hardware, e.g., in a control device.

The present invention also provides a device which is designed to carry out, actuate or implement the steps of a variant of the method disclosed herein in corresponding devices.

The device can be an electrical device having at least one processing unit for processing signals or data; at least one memory unit for storing signals or data; and at least one interface and/or one communications interface for reading in or outputting data that are embedded in a communications protocol.

For instance, the processing unit may be a signal processor, what is known as a system ASIC, or a microcontroller for processing sensor signals and outputting data signals as a function of the sensor signals. The memory unit, for instance, may be a flash memory, an EPROM, or a magnetic memory unit. The interface is able to be developed as a sensor interface for reading in the sensor signals from a sensor and/or as an actuator interface for outputting the data signals and/or control signals to an actuator. The communications interface may be developed to read in or output the data in a wireless and/or wired manner. The interfaces can also be software modules, which are provided on a microcontroller in addition to other software modules.

Advantageous is also a computer program product or a computer program having program code, which may be stored on a machine-readable carrier or memory medium such as a semiconductor memory, a hard disk memory, or an optical memory and be used to perform, implement and/or actuate the steps of the present method as disclosed herein in one of the above-described embodiments, in particular when the program product or program is executed on a computer or a device.

It is pointed out that some of the possible features and advantages of the present invention are described with reference to different embodiments in this disclosure. One skilled in the art recognizes that the features of the device and the method are able to be suitably combined, adapted or exchanged in order to obtain further embodiments of the present invention.

BRIEF DESCRIPTION OF THE DRAWINGS

In the following text, example embodiments of the present invention are described with reference to the appended drawing, but neither the figures nor the description should be regarded as a limitation of the present invention.

The figures are merely schematic and not true to scale. Identical reference numerals in the figures denote the same or equivalently acting features.

DETAILED DESCRIPTION OF EXAMPLE EMBODIMENTS

Figure 1:
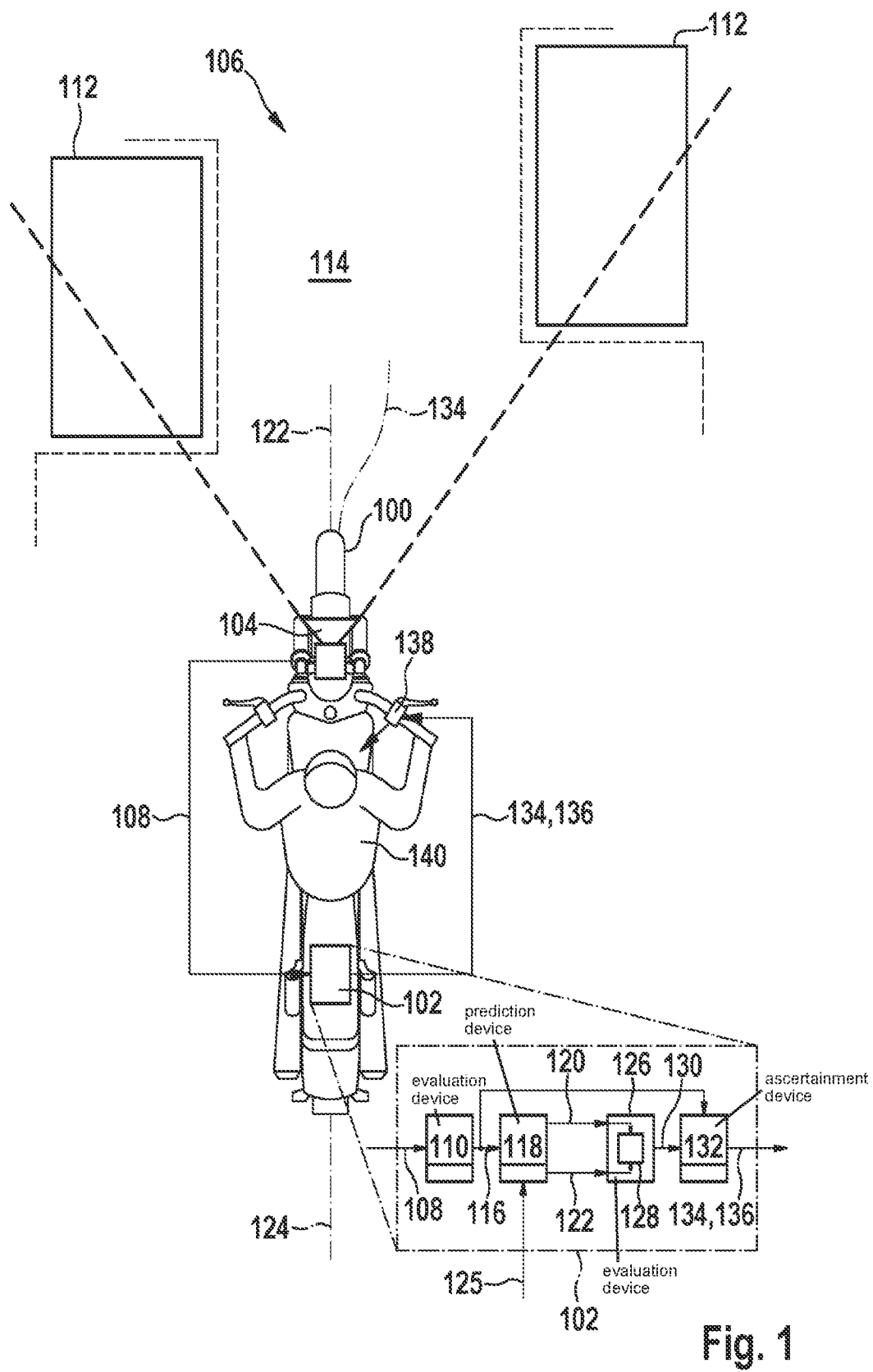
FIG. 1 shows an illustration of a motorcycle having a device according to an exemplary embodiment of the present invention.

FIG. 1 shows an illustration of a motorcycle 100 having a device 102 according to an exemplary embodiment. Here, motorcycle 100 is equipped with a camera 104 pointing toward the front. Camera 104 acquires a section of an environment 106 of motorcycle 100 and images it in an item of environment information 108. Device 102 reads in environment information 108 and evaluates it in an evaluation device 110 of device 102. In the process, objects 112 in environment 106 are detected using algorithms of machine vision.

With the aid the detected objects, usable free spaces 114 between objects 112 are identified and imaged in free space information 116. A prediction device 118 of device 102 predicts from a change in free spaces 114 during a past time period, that is, from at least two items of free space information 116 produced at a time offset from one another, a likely future change 120 in free spaces 114 in a future time period. The time periods may include a few seconds, for instance.

In addition, prediction device 118 predicts a probable future trajectory 122 of motorcycle 100 in the future time period using a current trajectory 124 of motorcycle 100 that was detected during the past time period, for example. Current trajectory 124 may be acquired via sensors on motorcycle 100, for instance.

In an evaluation device 126 of device 102, change 120 and future trajectory 122 are evaluated for conflicts 128. Evaluation device 126 indicates conflict 128 as a conflict case 130. In conflict case 130, at least one conflict-free alternative trajectory 134 is ascertained for motorcycle 100 in an ascertainment device 132 of device 102 with the aid of the free space information 116. Alternative trajectory 134 is imaged in trajectory information 136 and communicated via a communications system 138 of device 102 or of motorcycle 100 to a rider 140 of motorcycle 100.

In one exemplary embodiment, camera 104 is embodied as a helmet camera of rider 140. The helmet camera likewise acquires a section of environment 106 in the environment information. However, the section is variable, that is, dependent on a head position of rider 140.

In one exemplary embodiment, communications system 138 is designed to supply haptic signals for rider 140 as a communications path. For this purpose, sensors for vibrations and/or pulses are situated at at least two contact points between rider 140 and motorcycle 100. For example, sensors of communications system 138 are situated on both handlebars of motorcycle 100. Alternatively or additionally, sensors may be situated in pairs on the footrests and/or on the side of the tank. Via vibrations and/or pulses on the right or left sensor, a direction of alternative trajectory 134 is able to be communicated. Warnings can be output on both sensors simultaneously. A seat surface of the motorcycle is likewise able to transmit pulses and/or vibrations to the rider via one or more sensor(s). The vibrations and/or pulses, for example, may be output until the rider 140 drives on alternative trajectory 134.

In one exemplary embodiment, communications system 138 is designed to supply acoustic signals as a communications path for rider 140. To this end, for example, motorcycle 100 may have a loudspeaker directed toward rider 140. In the same way, the acoustic signals may be supplied via earphones in the helmet of rider 140. For example, a headphone cable of the helmet may be plugged into motorcycle 100 for this purpose. In an advantageous manner, the acoustic signals are able to be transmitted to the headphones in a wireless manner. The acoustic signals may be tones or tone sequences. The acoustic signals may also be spoken instructions or warnings. The acoustic warnings are able to be provided in combination with haptic and/or optical signals.

In one exemplary embodiment, communications system 138 is designed to supply optical signals for rider 140 as a communications path. For instance, at least one signal lamp is situated in a cockpit of motorcycle 100. The signal light may light up, flash and/or change color. In the case of signal lamps installed as pairs to the left and right, a direction of alternative trajectory 134 is able to be indicated. The signal lamps may also be installed in or on the helmet of rider 140.

Similar to the headphones, the signal lamps are able to be actuated in a wired or wireless manner.

In one exemplary embodiment, communications system 138 has a display for the display of trajectory information 136. Trajectory information 136 and further information is able to be graphically displayed on the display. The display can be fixedly integrated into the cockpit or also be embodied as a head-up display. In the same way, an external device, e.g., a navigation device situated in the field of view of rider 140, is able to be used as a display. The display may also be integrated into the helmet, however.

In one exemplary embodiment, the motorcycle includes a further camera which is facing toward rider 140. Via this camera, a viewing direction of rider 140 is detected. In this way, it can be ascertained whether rider 140 has registered trajectory information 136 or has recognized conflict 128. If rider 140 has not recognized trajectory information 136 and/or the looming conflict, trajectory information 136 is able to be communicated at a greater urgency. For instance, trajectory information may be communicated simultaneously on multiple of the aforementioned communications paths.

In one exemplary embodiment, a characteristic ego movement of motorcycle 100 is taken into account for predicting trajectory 122. The ego movement makes it possible to predict a required space of motorcycle 100 on trajectory 122 in such a way that an adequate safety distance from detected objects 112 is able to be observed in the conflict examination in evaluation device 126.

In one exemplary embodiment, alternative trajectory 134 is checked for its drivability with the aid of a mathematical single-track model of motorcycle 100. In this way it can be ensured that motorcycle 100 is able to travel alternative trajectory 134 without radical changes in velocity and/or radical changes in direction and without stability loss. If the drivability lies below a threshold value, then the alternative trajectory will be discarded and not communicated to rider 140. A different alternative trajectory 134 will then be ascertained, checked and communicated.

Figure 2:
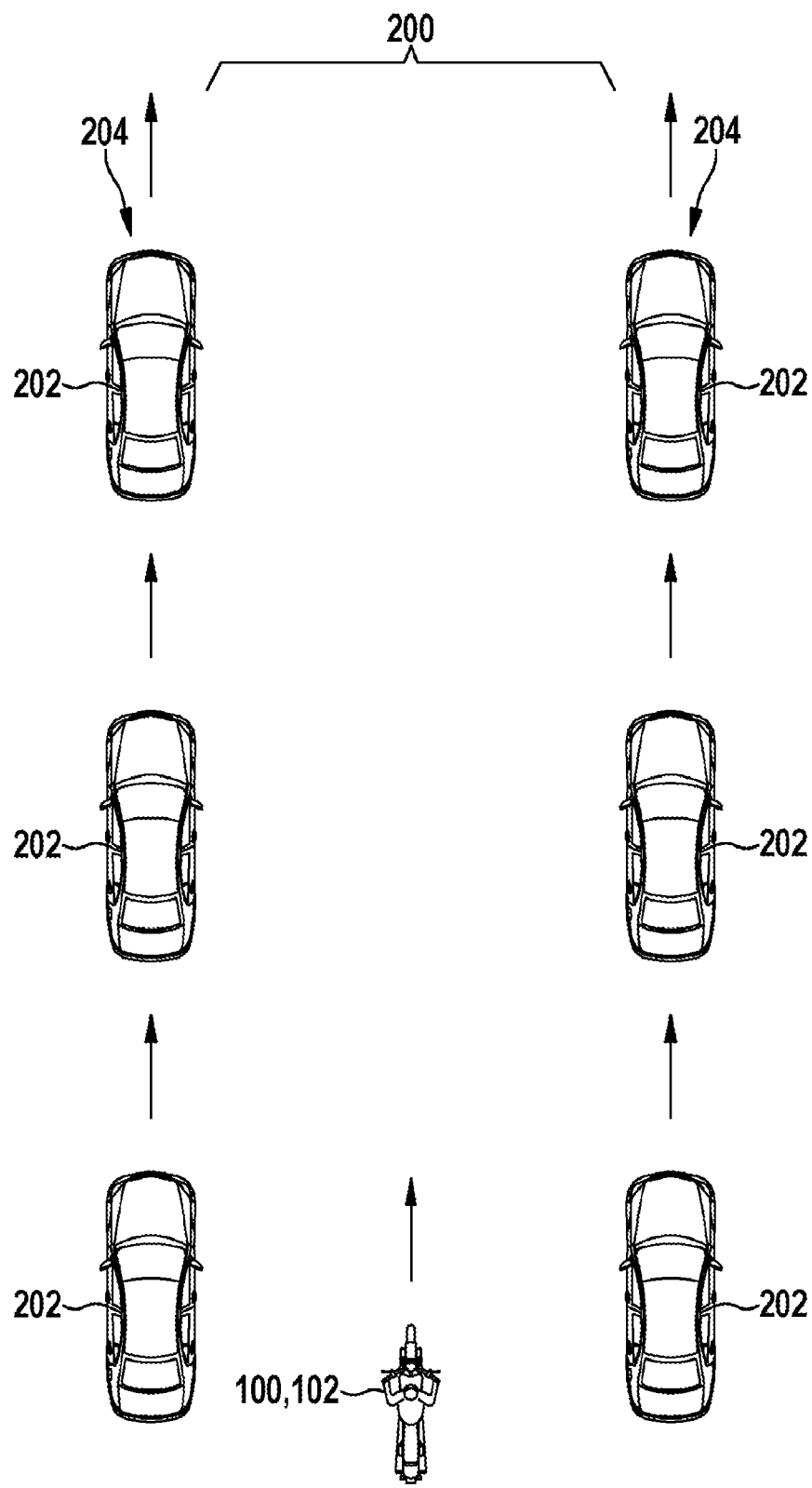
FIG. 2 shows an illustration of a motorcycle having a device according to an exemplary embodiment of the present invention on a lane between other vehicles.

FIG. 2 shows a representation of a motorcycle 100 equipped with a device 102 according to an exemplary embodiment in a lane 200 between other vehicles 202. Motorcycle 100 essentially corresponds to the motorcycle in FIG. 1. Motorcycle 100 travels on a directional road having at least two traffic lanes, driving in lane 200 between two columns 204 of vehicles 202. Device 102 detects vehicles 202 as objects while lane 200 is identified as a free space between the objects. Motorcycle 100 travels through lane 200 at a slightly greater velocity than vehicles 202.

Device 102 performs a movement prediction for vehicles 202 in the acquisition range of the camera. In the process, trajectory information of vehicles 202, that is, a current movement direction or a change in the movement direction and a current velocity or a current change in the velocity of vehicles 202, is used to infer a future movement direction and future velocity of vehicles 202. In this way, a development of the distances between vehicles 202 is able to be predicted.

Figure 3:
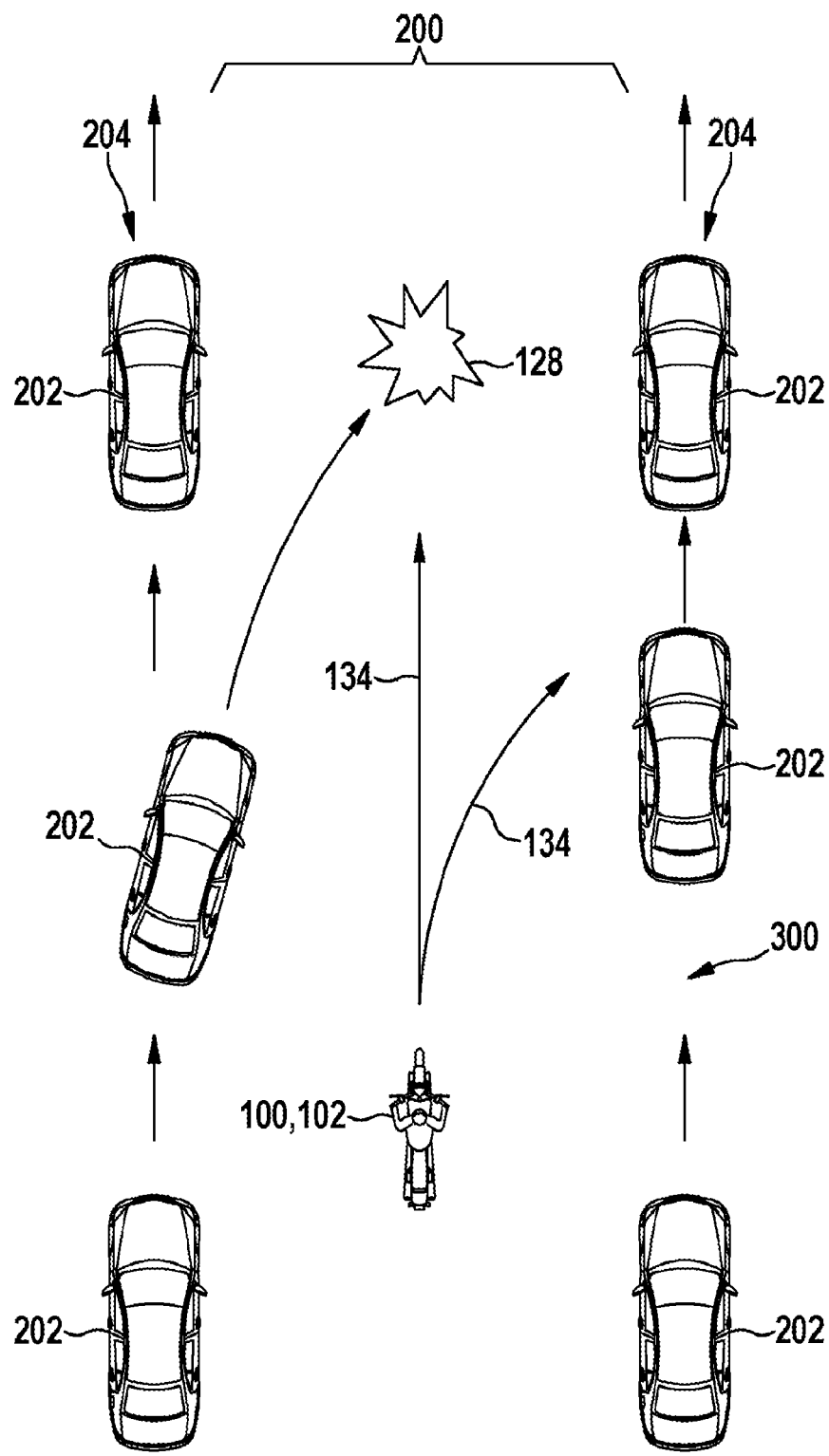
FIG. 3 shows an illustration of a motorcycle having a device according to an exemplary embodiment of the present invention in a lane featuring a vehicle pulling into the lane.

FIG. 3 shows an illustration of a motorcycle 100 provided with a device 102 according to an exemplary embodiment in a lane 200 together with a vehicle 202 pulling into the lane 200. The illustration essentially corresponds to the illustration in FIG. 2. Here, a vehicle 202 pulls out of left column 204 and moves into lane 200 in front of motorcycle 100. Device 102 identifies the imminent conflict 128 and ascertains alternative trajectories 134. There is the possibility of accelerating in order to thereby still pass vehicle 202 pulling out of column 204, of braking and lining up behind vehicle 202 pulling out, or of laterally evading in the direction of other column 204. The possibility of evading is an option because a gap 300 to the right of motorcycle 100 has just opened up since a vehicle 202 in right column 204 increases its distance from the vehicle driving ahead.

Figure 4:
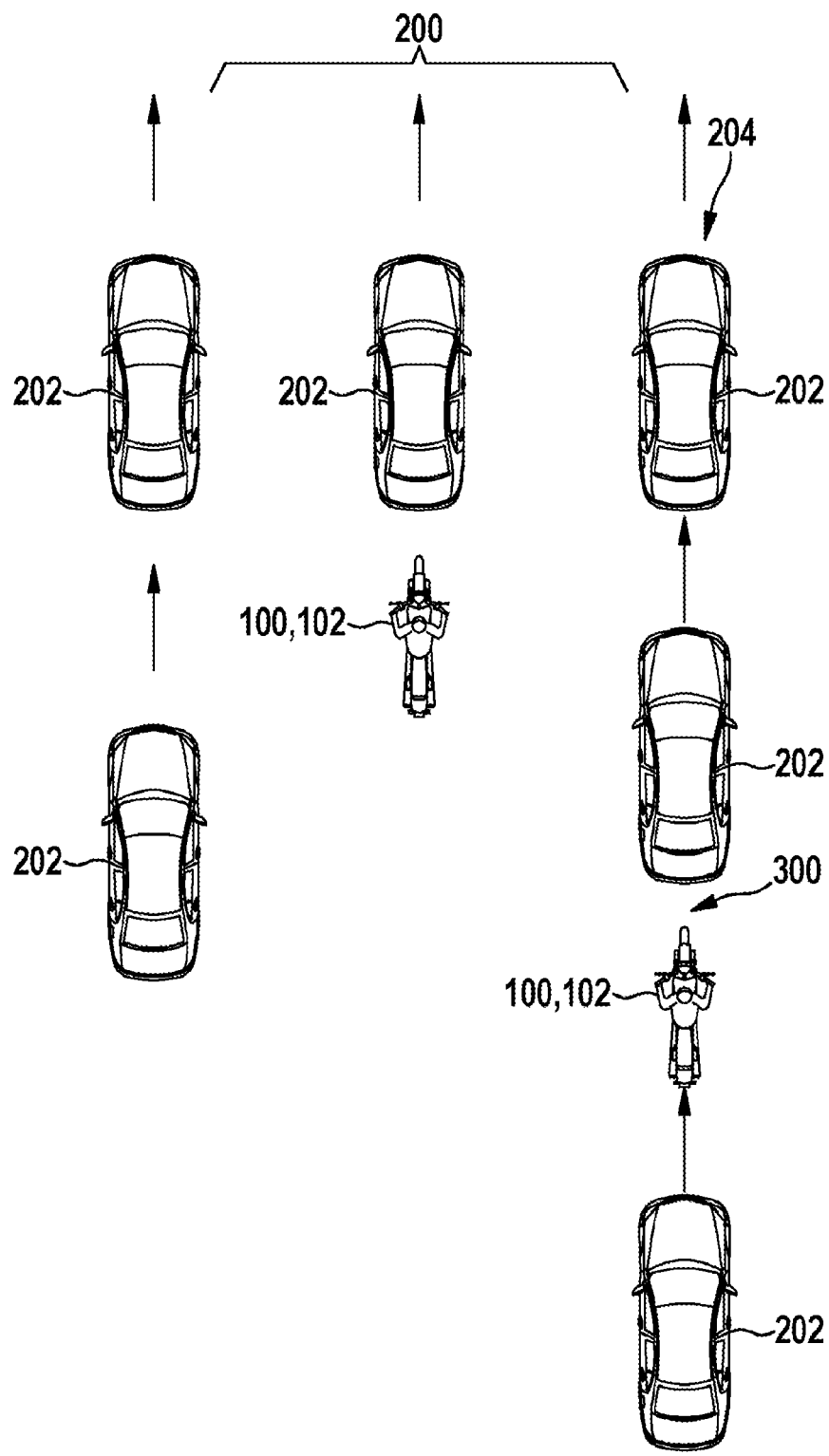
FIG. 4 shows an illustration of a motorcycle having a device according to an exemplary embodiment of the present invention on an evasion trajectory ascertained in the device.

FIG. 4 shows a representation of a motorcycle 100 having a device 102 according to an exemplary embodiment on an evasion trajectory ascertained in device 102. The illustration essentially corresponds to the illustration in FIG. 3. In this instance, vehicle 202 has pulled into lane 200 and is blocking lane 200.

In one exemplary embodiment, device 102 has prompted the driver to brake. As a result, motorcycle 100 is now driving behind vehicle 202 which has pulled in ahead.

In one exemplary embodiment, device 102 has prompted the driver to make an evasive move to the right into gap 300. As a result, the driver has lined up in right column 204. Alternatively, however, the driver also has the option of driving through gap 300 in order to reach the right side of right column 204 and to continue his travel there.

In other words, FIGS. 1 through 4 show a predictive two-wheeler assistant for collision avoidance in changes in the driving direction of involved road users.

Motorcycles are more agile, smaller, have more variable and numerous trajectories than passenger cars and are often not noticed or noticed too late by drivers of passenger cars. Driving through lanes and weaving in and out of dense traffic pose high accident risks because motorcycles in the back and their riders are often not noticed or noticed too late by drivers of passenger cars. Multi-lane roads in city traffic pose similar risks. Here, the vehicles often travel next to one another at similar speeds. A driver of a passenger car is often in a hurry and drives on the presumed faster left lane. However, if the traffic in the right lane flows faster after all, a motorcyclist can easily end up in the blind spot. The harried passenger car driver intent on using the next exit overlooks the motorcycle. (example: federal road B14 in the center of Stuttgart)

The approach presented here makes it possible to avoid accidents between motorcycles and other vehicles in road traffic.

To this end, the motorcyclist is warned in an anticipatory and timely manner of vehicles pulling into or crossing the predicted future trajectory of the motorcycle. Optionally, depending on the exemplary embodiment, this may include additional accident-avoiding system interventions in the motorcycle and/or the involved vehicles.

The advantage of the approach presented here lies in a further reduction of serious motorcycle accidents and hence a lower injury risk of the motorcyclists.

With the aid of a camera pointing toward the front in the driving direction and machine vision (methods and algorithms for a feature extraction, object detection and classification), vehicles, vehicle light signals, traffic signs/traffic lights and road markings, infrastructure (buildings, bridges, guardrails, traffic lanes, sidewalks, etc.), persons and others are detectable in real time and in an automatic manner.

Based on this information, a free space detection of drivable spaces is possible, e.g., in the driving direction. A vehicle is able to drive into these spaces or make an evasive move into these spaces without colliding with other objects. Free spaces evaluated here include spaces between vehicles, longitudinally or transversely to the driving direction, or the predicted trajectory of the motorcycle.

Based on the respective kinematics and dynamics of the motorcycle and the other vehicles, the particular trajectories that indicate a likelihood or a risk of encountering vehicles or intersecting with the trajectories are able to be predicted in or onto these free spaces.

Since even this may not be sufficient for the motorcycle and rider, in particular when tight driving lanes and/or vehicle spacings are involved (weaving in and out), indicators for likely imminent changes in the free spaces and changes in the predicted trajectories of the other vehicles are identified. Probable reductions in the driving lane width and/or a reduction of the vehicle spacings are of interest in this context.

For example, spontaneous changes in the pose of the vehicles may point to a change in the predicted trajectories of the vehicles.

The changes are able to be identified with the aid of machine vision.

For example, if activated flashers of the vehicle are detected along the predicted driving lane of the motorcycle with the aid of machine vision, then a change in the predicted trajectories of the flashing vehicles in the flashing direction may be imminent.

From the predicted free spaces and the trajectory of the motorcycle, it can be derived whether comfortable and safe driving and/or accelerating and/or braking is/are still possible. If this is not the case, then the drivers of the other vehicles along the predicted trajectory of the motorcycle are able to be warned by automatically activated light sand/or horns of the motorcycle. The free space toward the front, but at least along the predicted trajectory of the motorcycle, and a comfortable and safe route are able to be indicated to the rider of the motorcycle. Depending on the dynamics of the change in the free spaces, a recommendation to accelerate (the free space will soon be insufficient but may still be passed through at a higher speed), or to brake (free space is insufficient) may be made.

In addition, haptic and/or visual and/or acoustic signals may also assist the motorcyclist. For example, if an evasive maneuver of the motorcycle without a collision is possible only to the left, then an indication may be given by vibrations, and/or the motorcyclist can be aided in a rapid decision by a green LED to the left and/or a red LED to the right.

In one exemplary embodiment, a free space detection around the motorcycle (in addition to the side and back) is implemented on the motorcycle. This makes it possible to indicate to the motorcyclist that more spontaneous steering/evading is possible without first looking in the mirror; glancing over the shoulder and/or the need to turn around for orientation, etc. in order not to collide with the parallel and rear traffic (faster reaction times).

Based on a predicted trajectory estimate and with the aid of machine vision of detected traffic signs and road markings, etc., it is also possible to estimate beginning lane changes and directional changes of vehicles even without the vehicles operating their flashers (e.g., drivers who do not flash and look), and acoustic and/or light signals may be used to warn the respective drivers.

As a matter of principle, all distance-measuring and object-detecting sensors facing to the sides and rear are able to be used to detect free spaces and objects around the vehicle. For example, the rearward directed ultrasonic sensor or radar may determine the distance to the next vehicle in the rear, and the side cameras, directed to the rear, of the mirror substitute system, for example, and/or of the surround view system (360°) are able to detect a motorcycle approaching on the side from behind.

A distance between the vehicles that is too tight is able to be indicated laterally outside the vehicles so that the motorcyclist understands that weaving back and forth through the column is not possible.

A motorcyclist approaching from the rear on the side is able to be indicated or signaled to the driver of the vehicle in the mirror and/or the displays in the vehicle so that the driver is warned or pays attention when he intends to move into the lane or the predicted trajectory of the motorcycle.

If the vehicle is equipped with a driver-monitoring camera, then it can furthermore be detected whether the driver has seen and perceived the warning and/or has seen and noticed in the mirror and/or rear-facing and/or side videos. Advantageous are driver-monitoring cameras which cover a 360° inner view of the driver so that a driver's glance or head direction or viewing direction would then be easily detectable even laterally or toward the back (over the shoulder glance). If the driver has not noticed the motorcyclist, then this is able to be indicated on the side of the vehicles so that the motorcyclist approaching on the side from the back is warned.

If a V2V communication exists between the motorcycle and vehicle(s), then positions, poses, predicted trajectories, planned routes, distances, approach speeds, meeting times, etc. may be mutually exchanged. At least for the networked vehicles and motorcycles, the externally visible signaling may then be dispensed with.

In addition, a communication via a Cloud is possible where all information is able to be fused in a map. This fused map is then accessible to all users. Based on the predicted trajectories and free spaces fused in the Cloud on the basis of the fused information, it is then possible to transmit warnings to the motorcyclists and/or vehicle drivers that use it. Depending on the used display technology, the display may be realized by warning lamps up to and including the display of the free space on a display, and/or by smart glasses (a transparent, holographic display in the visor of the helmet) using danger regions marked in color and/or trajectories and/or augmented reality (superimposed symbols and/or highlighting and/or markings, etc.).

If the motorcycle or helmet or the glasses of the motorcyclist also has/have a driver-monitoring camera, then it can also be detected whether the motorcyclist has seen and perceived the warnings and/or the mirror or has seen or perceived rearward and/or side videos. Advantageous are driver-monitoring cameras, which are situated in the helmet or glasses, which would then also make it easy to detect a driver's glance or a head direction or viewing direction to the side and toward the rear (over the shoulder glance). If the motorcyclist has not noticed the vehicle driver, then this can be indicated on the outside of the motorcycle so that the other road users such as a vehicle driver changing the driving direction or traffic lane are warned.

For example, if a slight drift of the vehicle toward the left is noticed by the motorcycle and the predicted trajectory of the vehicle collides with the trajectory in the future, but the route planning and/or directional indicator/flasher is activated on the right and the electronic horizon predicts a change in the driving direction to the right for this predicted trajectory of the vehicle, then the warning may be omitted until a clearer change in the trajectory to the left materializes (driving contrary to the planning and/or flashing) and/or the driving lane/free space does not offer sufficient space for the motorcycle and/or a drop below a required braking distance appears to be imminent.

The current and predicted information of looming collisions, an overlapping of trajectories, insufficient free spaces (driving lanes, vehicle gaps), etc. may also be used to initiate or boost braking operations and/or steering operations.

For instance, if an evasive maneuver of the motorcycle to free spaces without a collision is possible only to the left at this point, then the motorcyclist is able to be assisted in a rapid decision (spontaneous and rapid steering or evasive maneuvering) by greater steering resistances to the right.

For instance, if an initiated braking operation is predicted to be insufficient for avoiding a collision, then the braking force is able to be boosted autonomously.

The turn signal lights/flashers may be set automatically.

The horn as an acoustic warning signal is able to be triggered automatically, possibly by a certain rhythm which is unable to be generated manually, e.g., short tones in rapid succession. This makes it possible to distinguish an automatic sounding of the horn from one implemented manually.

The present invention disclosed herein particularly assists in the avoidance of potential accidents caused by drivers not previously getting their bearings and not indicating and pulling into the trajectory/free space of the motorcycle (accidents by moving across, moving in front, cutting in, closing the gap, etc.).

It is finally pointed out that terms like "have", "including", etc. do not exclude other elements or steps and a term like "a" does not exclude a multiplicity.

What is claimed is:

1. A method for operating a motorcycle, the method comprising the following steps:
    acquiring images of an environment of the motorcycle using a camera on the motorcycle;
    detecting, based on the acquired images, free spaces in the environment that are usable by the motorcycle;
    predicting, using the acquired images, a change in the free spaces in a future time period based on changes in the free spaces during a past time period, wherein the predicting of the change in free spaces is also based on a movement prediction of other road users;
    predicting a future trajectory of the motorcycle in the future time period using a trajectory of the motorcycle that was detected during the past time period, the trajectory being detected via sensors on the motorcycle;
    evaluating for conflicts, using an electrical device of the motorcycle having a processor and memory, the predicted change in the free spaces and the predicted future trajectory;
    based on detecting a conflict, ascertaining a conflict-free alternative trajectory for the motorcycle, and communicating, via a communication system of the motorcycle, the conflict-free alternative trajectory to a rider of the motorcycle;
    wherein the motorcycle is actuated to follow the alternative trajectory when the rider shows no reaction to the communication within a reaction time;
    wherein the movement prediction of other road users upon which the prediction of the change in free spaces is based on trajectory information of other road users, the trajectory information of at least one of the other road users being received from the one of the other road users via a digital communication channel;
    wherein a characteristic ego movement of the motorcycle is taken into consideration for predicting the future change in the free spaces, the characteristic ego movement including a serpentine line due to a speed of the motorcycle.

2. The method as recited in claim 1, wherein a drivability of the alternative trajectory is ascertained using a mathematical single-track model of the motorcycle.

3. The method as recited in claim 1, wherein light signals of the other road users are acquired when detecting the environment and the movement prediction is made using the light signals.

4. The method as recited in claim 1, wherein warning signals are transmitted to the other road users based on predicting the conflict.

5. The method as recited in claim 1, wherein the alternative trajectory is communicated to the rider by the communication system using haptic signals.

6. The method as recited in claim 1, wherein the alternative trajectory is optically communicated to the rider by the communication system.

7. The method as recited in claim 1, wherein the alternative trajectory is ascertained using map information of the environment.

8. The method according to claim 1, wherein the camera on the motorcycle is a helmet camera on the rider of the motorcycle.

9. The method according to claim 1, wherein the free spaces in the environment are detected by detecting, using the images and machine vision, objects in the environment, and usable free spaces between the detected objects is identified and imaged in free space information, and wherein the predicting of the change in the free spaces being based on at least two items of the free space information produced at a time offset from one another.

10. The method as recited in claim 1, wherein the actuating of the motorcycle to follow the alternative trajectory when the rider shows no reaction to the communication within the reaction time includes actuating a steering actuator of the motorcycle using which the steering as adjusted.

11. The method as recited in claim 1, wherein the serpentine line becomes progressively more pronounced with decreasing speed of the motor vehicle.

12. A device comprising a processor and memory, the device configured to operate a motorcycle, the device configured to:
  acquire images of an environment of the motorcycle using a camera on the motorcycle;
  detect, based on the acquired images, free spaces in the environment that are usable by the motorcycle;
  predict, using the acquired images, a change in the free spaces in a future time period based on changes in the free spaces during a past time period, wherein the predicting of the change in free spaces is also based on a movement prediction of other road users;
  predict, by the electrical device, a future trajectory of the motorcycle in the future time period using a trajectory of the motorcycle that was detected during the past time period, the trajectory being detected via sensors on the motorcycle;
  evaluate for conflicts, using an electrical device of the motorcycle having a processor and memory, the predicted change in the free spaces and the predicted future trajectory;
  based on detecting a conflict, ascertain a conflict-free alternative trajectory for the motorcycle, and communicate, via a communication system of the motorcycle, the conflict-free alternative trajectory to a rider of the motorcycle;
  wherein the motorcycle is actuated to follow the alternative trajectory when the rider shows no reaction to the communication within a reaction time;
  wherein the movement prediction of other road users upon which the prediction of the change in free spaces is based on trajectory information of other road users, the trajectory information of at least one of the other road users being received from the one of the other road users via a digital communication channel;
  wherein a required space of the motorcycle on the predicted trajectory is predicted using a characteristic ego movement of the motorcycle so that a safety distance from detected objects is considered in the evaluation for conflicts, the characteristic ego movement having a greater space requirement than a projection of the motorcycle onto the ground due to a tilt of the motorcycle while driving through a curve.

13. A non-transitory machine-readable memory medium on which is stored a computer program for operating a motorcycle, the computer program, when executed by a computer, causing the computer to perform the following steps:
  acquiring images of an environment of the motorcycle using a camera on the motorcycle;
  detecting, based on the acquired images, free spaces in the environment that are usable by the motorcycle;
  predicting, using the acquired images, a change in the free spaces in a future time period based on changes in the free spaces during a past time period, wherein the predicting of the change in free spaces is also based on a movement prediction of other road users;
  predicting a future trajectory of the motorcycle in the future time period using a trajectory of the motorcycle that was detected during the past time period, the trajectory being detected via sensors on the motorcycle;
  evaluating for conflicts, using an electrical device of the motorcycle having a processor and memory, the predicted change in the free spaces and the predicted future trajectory;
  based on detecting a conflict, ascertaining a conflict-free alternative trajectory for the motorcycle, and communicating, via a communication system of the motorcycle, the conflict-free alternative trajectory to a rider of the motorcycle;
  wherein the motorcycle is actuated to follow the alternative trajectory when the rider shows no reaction to the communication within a reaction time;
  wherein the movement prediction of other road users upon which the prediction of the change in free spaces is based on trajectory information of other road users, the trajectory information of at least one of the other road users being received from the one of the other road users via a digital communication channel;
  wherein a characteristic ego movement of the motorcycle is taken into consideration for predicting the future change in the free spaces, the characteristic ego movement including a serpentine line due to a speed of the motorcycle.

* * * * *